United States Patent [19]
Byerly et al.

[11] Patent Number: 5,724,715
[45] Date of Patent: Mar. 10, 1998

[54] COMPOSITE FLANGE FOR DRIVE SHAFTS

[75] Inventors: Duane V. Byerly; George F. Olson; James T. Heard, all of Lincoln, Nebr.

[73] Assignee: Addax, Inc., Lincoln, Nebr.

[21] Appl. No.: 674,472

[22] Filed: Jul. 2, 1996

[51] Int. Cl.$^6$ ................................................ B60G 11/02
[52] U.S. Cl. ...................... 29/460; 156/148; 264/257; 464/181; 464/903
[58] Field of Search .................... 464/181, 182, 464/183, 179, 902, 903, 69, 147, 87; 87/9, 6; 264/257; 156/148; 29/460

[56] References Cited

U.S. PATENT DOCUMENTS

| | | | |
|---|---|---|---|
| 3,651,661 | 3/1972 | Darrow | 464/181 |
| 4,116,018 | 9/1978 | Weible | 464/903 X |
| 4,248,062 | 2/1981 | MaLain et al. | 156/148 X |
| 4,551,116 | 11/1985 | Krude | 464/181 X |
| 4,569,667 | 2/1986 | Hannibal et al. | 464/87 X |
| 4,681,556 | 7/1987 | Palmer | 464/183 X |
| 4,873,889 | 10/1989 | Ditlinger | 464/903 X |
| 4,973,372 | 11/1990 | Ditlinger | 464/903 X |
| 5,314,382 | 5/1994 | Pfeiferr | 464/183 X |
| 5,362,344 | 11/1994 | Ben-Porat et al. | 156/148 |
| 5,397,272 | 3/1995 | Smiley et al. | 464/181 |

*Primary Examiner*—Eileen A. Dunn
*Attorney, Agent, or Firm*—Henderson & Sturm

[57] ABSTRACT

A composite flange providing the low cost and bonding capability of molded flanges with the torque capacity near that of metal flanges. Multiple layers of braided fiberglass enveloping a fiberglass ring are placed into a mold of the desired shape. After the mold is closed, liquid resin is injected and the flange is cured to the desired state. After demolding, the flange is machined as necessary for installation onto the drive shaft.

1 Claim, 4 Drawing Sheets

5,724,715

1

COMPOSITE FLANGE FOR DRIVE SHAFTS

TECHNICAL FIELD

This invention relates to drive shaft flanges, and more particularly to flanges fabricated from composite materials, particularly for use with composite drive shafts.

BACKGROUND ART

In the design and manufacture of rotating drive shafts for transmitting mechanical torque, it is commonly necessary to provide a structural surface normal to the axis of the drive shaft and firmly attached to the shaft. This structural component, referred to as a flange, is usually circular, but may consist of two or more "ears" or parts of a circle. This flange is used in the attachment of cardan joints or other flexible or rigid coupling elements to the drive shaft.

Drive shaft flanges have traditionally been fabricated from metals. These metal flanges are simple to manufacture and are well suited for use with metal drive shafts since they may be joined by any common means such as welding, bolting, riveting, compression fitting, or adhesive bonding. However, when metal flanges are used in conjunction with composite drive shafts, they cannot be joined by welding, and riveting and bolting weaken the composite shaft. Furthermore, compression fitting is subject to slippage, while adhesive bonding is difficult due to the dissimilarity of the materials.

Molded composite flanges are known in the art, but these flanges suffer from relatively low stiffness and strength compared to metal flanges since they are manufactured by a simple molding process and do not utilize continuous fiber. When used at higher torque levels, it was found necessary to either use a metal flange or a metal reinforced molded composite flange.

Those concerned with these and other problems will recognize the need for an improved composite flange for drive shafts.

DISCLOSURE OF THE INVENTION

The present invention discloses a composite flange with a 50-75% increase in peak torque rating for a given sized coupling, thereby providing the low cost and bonding capability of molded flanges with the torque capacity near that of metal flanges. Multiple layers of braided fiberglass enveloping a fiberglass ring are placed into a mold of the desired shape. After the mold is closed, liquid resin is injected and the flange is cured to the desired state. After demolding, the flange is machined as necessary for installation onto the drive shaft.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
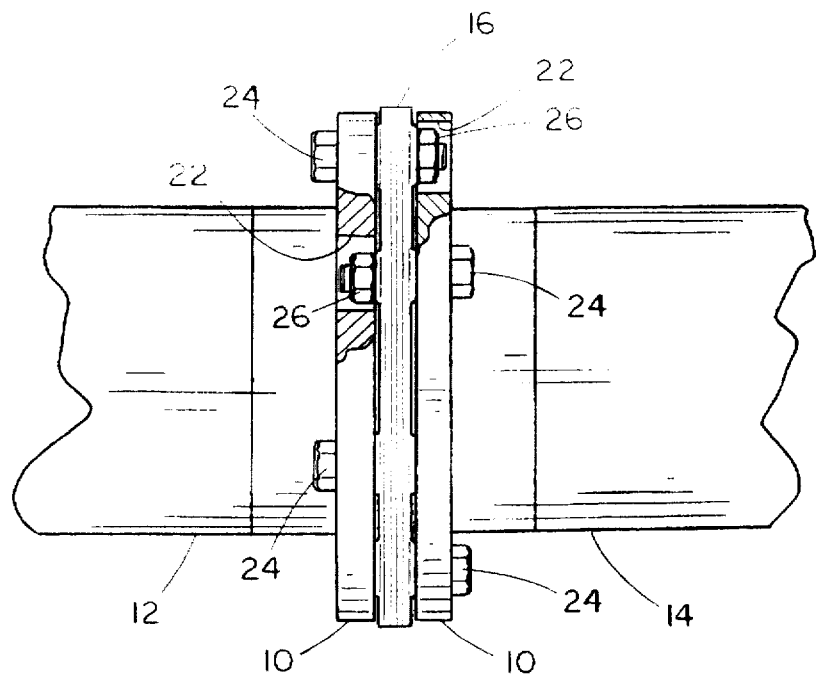
FIG. 1 is a side view, partially in section, depicting a pair of drive shafts utilizing composite flanges of the present invention and connected together through a flexible coupling.

Referring now to the drawings, wherein like reference numerals refer to identical or corresponding parts throughout the several views, FIG. 1 depicts a first composite flange 10 of the present invention affixed to a composite driving shaft 12, and a second composite flange 10 of the present invention affixed to a composite driven shaft 14. A flexible coupling 16 is disposed between the two flanges 10 to accommodate periods of axial and angular misalignment between the two shafts. An example of the use of such shafts is in cooling towers for electrical power plants where composite shafts are used to connect electric motors to gearboxes which in turn drive large cooling fans. Composite materials are particularly useful in such situations because of the very corrosive atmosphere in which they must operate.

Figure 2:
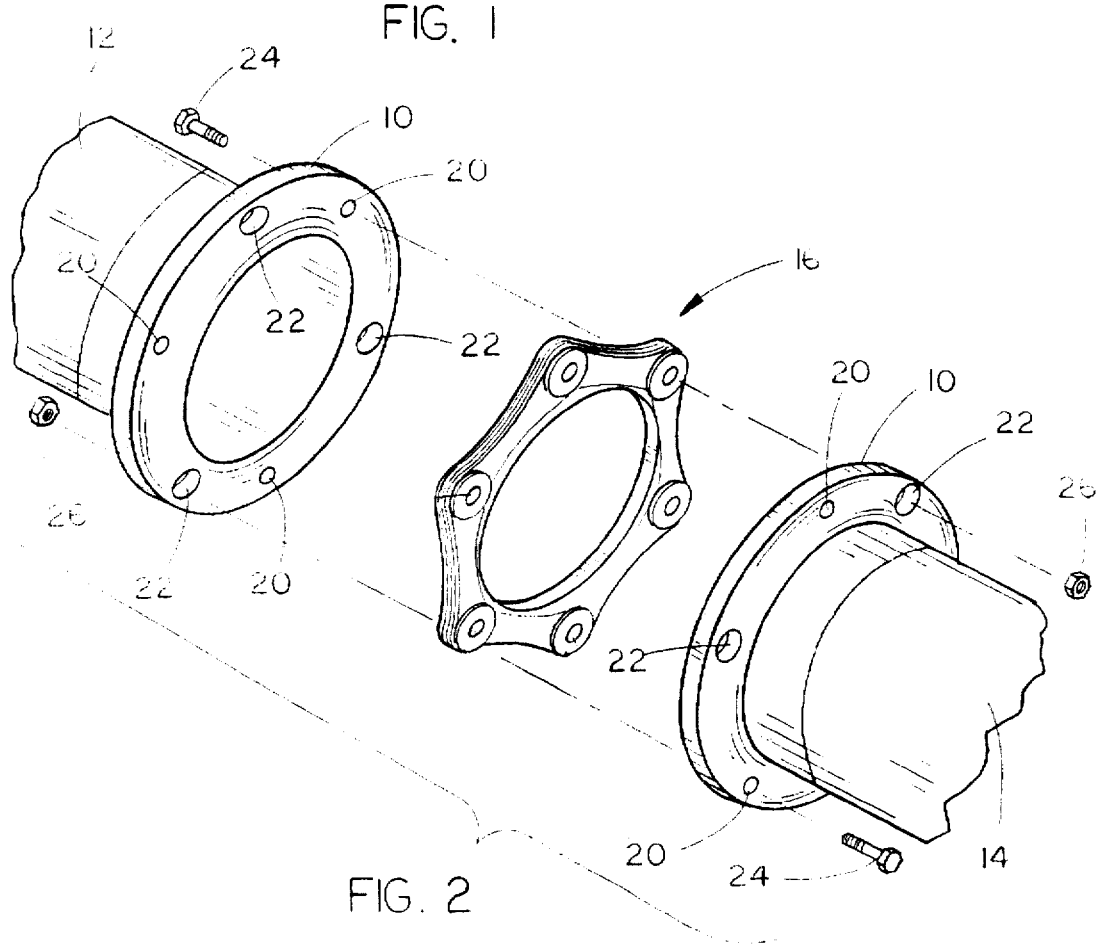
FIG. 2 is an exploded perspective view of the apparatus of FIG. 1.

The apparatus of FIG. 1 is exploded in FIG. 2 to more clearly show the flanges 10 and the manner of securing them together with the flexible coupling 16 sandwiched therebetween. Each of the flanges 10 has, in this particular embodiment, six fastener holes equally spaced about their faces, with three alternating, smaller "working" holes 20 and three alternating larger "clearance" holes 22. Each of the flanges 10 is bolted to the coupling 16 through its three "working" holes 20 by means of bolts 24 and nuts 26. The larger "clearance" holes 22 prevent the flange from being engaged by the nuts 26 as well as provide access to the nuts 26 through the flange 10. In this manner the coupling 16 provides the necessary flexibility between the two shafts 12, 14.

Figure 3:
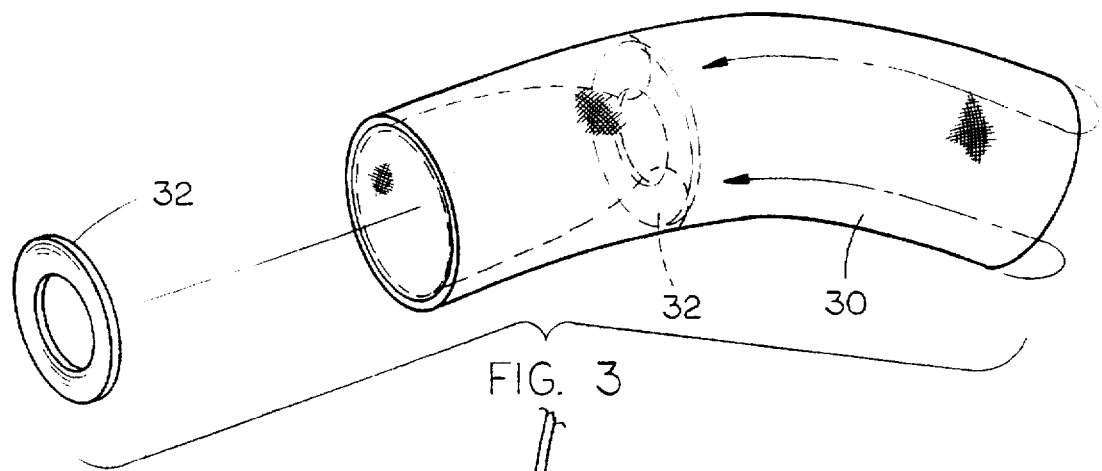
FIG. 3 is a perspective view of a step in the fabrication of the invention.
Figure 4A:
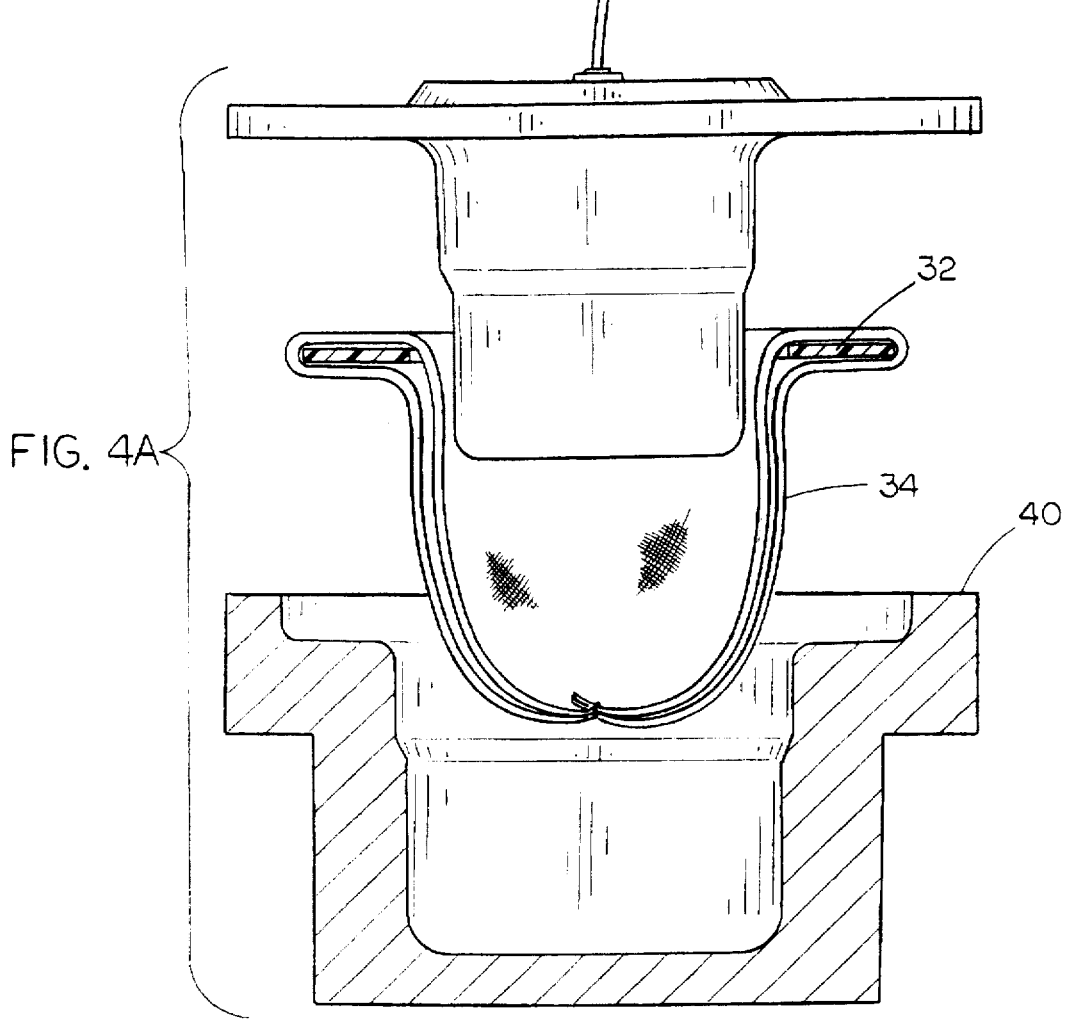
FIG. 4A is a sectional side view of the invention being placed into its mold during fabrication.
Figure 4B:
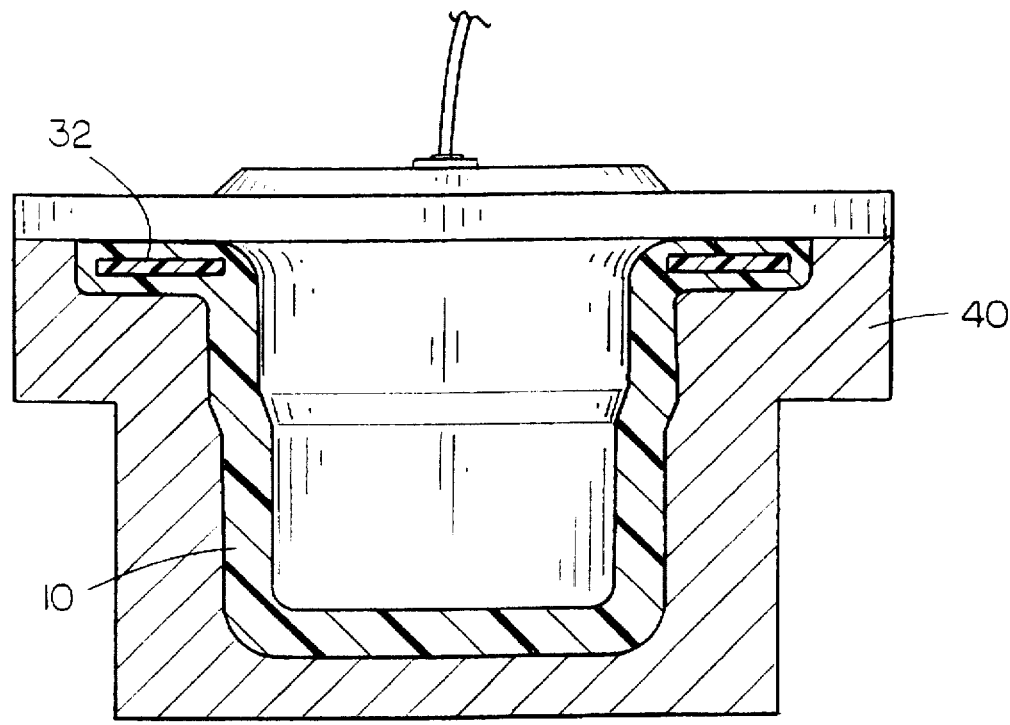
FIG. 4B is a sectional side view of the closed mold after injection and during curing.

The method of fabricating the invention is depicted in FIGS. 3, 4A, and 4B. The first step, not shown, involves repeatedly folding an elongate tube of braided fiber of the appropriate diameter back over itself to produce a shortened tube of multiple layers or laminates. In a preferred embodiment, a tube of braided fiberglass, such as MEGASOX, supplied by Atkins & Pearce, Inc., approximately eight feet long is folded back upon itself twice to form a four layered tube approximately two feet long. Other fibers such as carbon fiber or organic fiber could also be used. The resulting multi-layered tube is depicted at 30 in FIG. 3. A flat ring 32, preferably of G-10 fiberglass composite, is then inserted approximately half way into the tube 30 and one end of the tube 30 is then drawn back through the ring 32 as shown in dashed lines in FIG. 3 to form a flanged tube. The open end of the flanged tube 30, now comprising eight layers, is then sewn closed to create a cup-shaped preform 34.

Referring to FIGS. 4A and 4B, the preform 34 is inserted into a mold 40 which is closed and then injected with a liquid resin such as a vinyl ester matrix, although epoxies, phenolics, and urethanes are also suitable. The flat ring 32, while originally intended merely to assist in positioning the preform 34 in the mold, has had the unexpected benefit of increasing the moment of inertia of the flange face and thus enhances both the stiffness and the strength of the flange 10. After injection, the molding process is continued with a time/temperature/pressure regime designed to cure the assembly to the desired state. For example, fiberglass with a vinyl ester matrix is typically cured for 15 minutes at 165 degrees Farenheit at a pressure of 30 psi.

Figure 5:
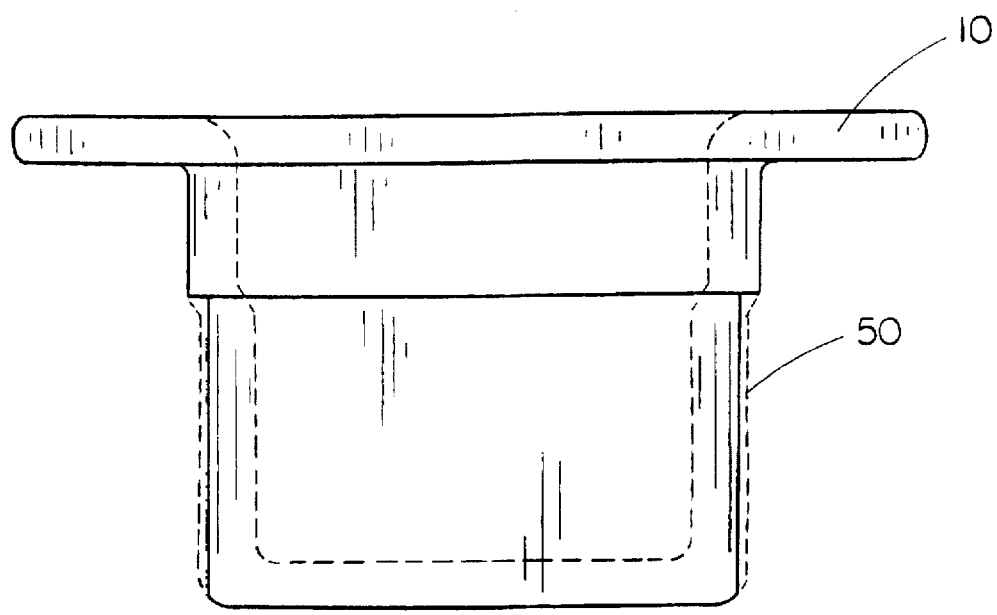
FIG. 5 is a side view depicting how the flange may be machined after the molding process.
Figure 6:
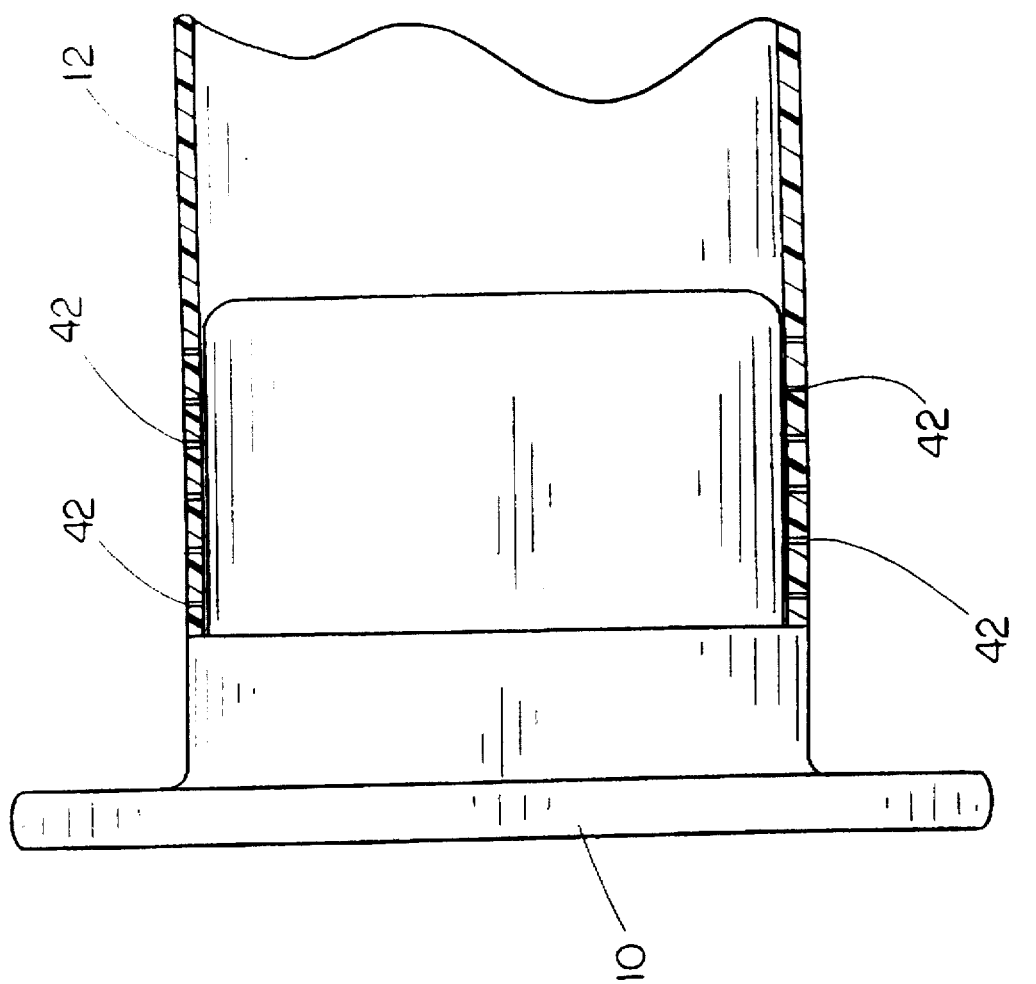
FIG. 6 is a sectional side view of the invention bonded to a composite drive shaft.

Referring now to FIGS. 5 and 6, after demolding the flange 10 is ready for any required machining operations which may be necessary to remove excess material as at 50 for proper mating with the shafts 12, 14. That portion of the flange 10 to be inserted into the shaft 12 is machined to an outside diameter slightly smaller than the inside diameter of the shaft 12. A number of holes 42 are drilled through the flange-receiving end of the shaft 12 through which adhesive may be injected into the narrow gap between the flange 10 and the shaft 12.

Those skilled in the art will recognize that many modifications and variations of the present invention are possible in light of the above teachings. It is therefore to be understood that, within the scope of the appended claims, the invention may be practiced otherwise than as specifically described.

What is claimed is:

1. A method for fabricating a composite flange for drive shafts, comprising the steps of:

(a) repeatedly folding an elongate tube of braided fiber back upon itself a plurality of times to create a shortened tube of multiple layers;

(b) inserting a flat ring approximately half way into said shortened tube and drawing one end of said shortened tube back through said flat ring to form a flanged tube having a disc end and an open end;

(c) closing said open end of said flanged tube to create a cup-shaped flange preform;

(d) inserting said flange preform into a flange mold;

(e) injecting a liquid resin into said mold; and (f) curing said resin.

\* \* \* \* \*